W. P. M. BRAUN.
HANDLE FOR LAWN MOWERS, &c.
APPLICATION FILED NOV. 24, 1916.
1,257,455.
Patented Feb. 26, 1918.
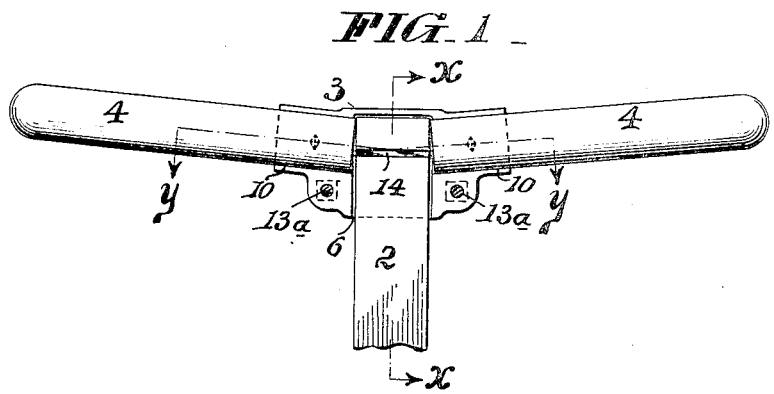
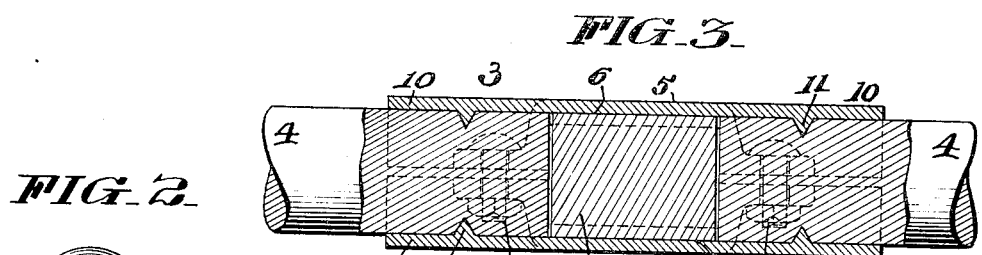
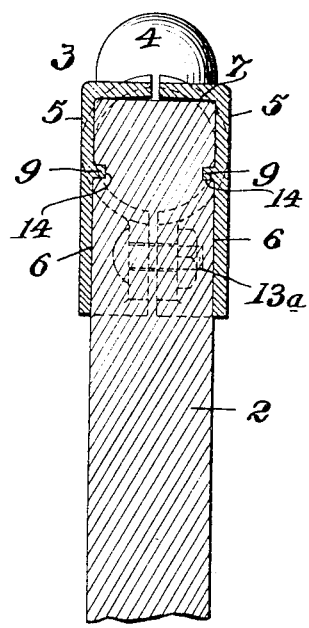
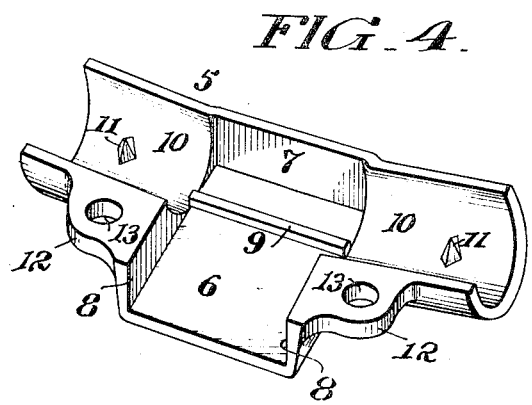
Witness
Daniel Webster, Jr.
Inventor
Wm. P. M. Braun
By ____ Attorney

UNITED STATES PATENT OFFICE.

WILLIAM P. M. BRAUN, OF PHILADELPHIA, PENNSYLVANIA, ASSIGNOR TO PENNSYLVANIA LAWN MOWER WORKS, A CORPORATION OF PENNSYLVANIA.

HANDLE FOR LAWN-MOWERS, &c.

1,257,455.  Specification of Letters Patent.  Patented Feb. 26, 1918.

Application filed November 24, 1916. Serial No. 133,100.

*To all whom it may concern:*

Be it known that I, WILLIAM P. M. BRAUN, a citizen of the United States, and resident of Philadelphia, county of Philadelphia, and State of Pennsylvania, have invented an Improvement in Handles for Lawn-Mowers, &c., of which the following is a specification.

My invention has reference to handles especially adapted to lawn mowers, and the improvements are directed more particularly to the end thereof which is grasped by the hands.

The object of my invention is to provide an inexpensive construction of handle suitable for lawn mowers which shall be strong and durable and provide lateral portions adapted to be grasped by the hands having such an angle with the longitudinal bar that they may be more conveniently grasped and less tiring upon the operator in manipulating the lawn mower. My object is further to provide a construction which is easily assembled or dismantled for convenience in packing and shipping.

My invention consists of a longitudinal bar having at its end a metallic clamping socket formed of two parts which in bolted relation clamp over the end of the bar and provide laterally extending tubular sockets arranged at an angle to each other and to the bar and provided with laterally extending handle portions clamped in said sockets, the said laterally projecting handle portions being in general transverse to the length of the bar but having the two handle portions at a slight angle to each other.

My invention also comprehends details of construction which together with the features above specified, will be better understood by reference to the drawings, in which:—

Figure 1 is a plan view of a handle structure embodying my invention but with the upper half of the metallic clamping socket removed to show the interior; Fig. 2 is a sectional view of the same taken on line *x—x* of Fig. 1; Fig. 3 is a sectional view of the same taken on line *y—y* of Fig. 1; and Fig. 4 is a perspective view of one of the clamping socket plates removed to show its interior construction.

2 represents the free end of the longitudinal bar portion of the handle structure by which the thrust is imparted to the lawn mower or other article to be pushed or pulled. This bar is rectangular at its free end as indicated in Fig. 3, and is provided on the top and bottom near the end with transverse grooves 14. This longitudinal bar 2 is clamped to the lateral handle portions 4—4 by means of the metal clamping socket portion 3 which comprises two castings 5, 5, of similar construction bolted together in opposed relation by bolts 13ª. These castings 5, 5, are similar and when opposed they provide a rectangular socket portion for receiving the end of the bar 2 and cylindrical tubular portions 10 for receiving the handle parts 4. More specifically considering one of the castings 5 (Fig. 4), the middle part is provided with a rectangular socket 6 having parallel side walls 8 and an upright rear wall 7, and moreover the socket portion 6 is provided at the bottom with a transverse rib 9 which is received in the transverse groove 14 of the bar 2. These castings 5, 5, moreover, have lateral extensions forming semi-cylindrical portions 10 having in their bottom part projecting lugs 11 which bite into the wooden handle portions 4 and hold them against being pulled out of the sockets. The action of these projections 11 upon the wooden handle portions 4 is clearly indicated in Fig. 3. The castings are further formed with the flanges 12 on each side of the socket portion 6 and between its walls 8 and the semi-cylindrical portions which add strength and also provide space for bolt apertures 13. When the two castings 5 are placed in opposed relation, they are clamped in position upon the end of the bar 2 and the adjacent ends of the handle portions 4 by means of bolts 13ª. The ribs 9 hold the metallic socket portion upon the end of the bar and the abutment end 7 rests upon the end of the bar 2 and transmits the thrust of the handle portion to it and in that way prevents undue wear coming upon the transverse groove portions 14.

As will be seen by reference to Figs. 1 and 4, the socket portions 10 for the handle parts 4 are at a slight inclination to the socket portion 6 for the bar and also at a slight angle to each other so that the handle portions 4 are not in true alinement but meet the bar 2 from opposite sides in such manner that they extend rearwardly at their free ends instead of projecting laterally at right angles. In this way, the two handle bars are at an angle to each other and are in the proper positions to be readily grasped by the operator without causing the hands to be twisted. The result is that the operator may perform much more work with the lawn mower before tiring than if the handle portions were at right angles to the main bar 2, as has heretofore been the custom.

The socket portions 5 are similar and reversible, and consequently the same pattern answers for both socket portions. The depth of the socket portions is slightly less than one-half the thickness of the bar 2 and the handle portions 4, so that when drawn together by the bolts 13$^a$, these portions tightly grip the wooden parts 2 and 4 and insure a very rigid and firm union of the said parts. Furthermore, should said wooden parts become shrunken or worn from constant use and strain, and due to the abrasion of the wood, the bolts 13$^a$ may be further tightened and the clamping action strengthened to compensate for any looseness theretofore existing.

While I have described my invention in the form which I have found well adapted in practice to the purposes for which it is designed, I do not restrict myself to the minor details as these may be modified in some particulars without departing from the spirit of the invention.

Having now described my invention, what I claim as new and desire to secure by Letters Patent, is:—

1. In a handle structure, the combination of the main bar having its end portion made rectangular, with two laterally extending handle portions arranged at an incline to the bar and at a slight angle to each other, two clamping metal socket portions each having a rectangular socket for the end of the bar and laterally arranged sockets for the handle portions at a slight angle to each other and at an angle to the rectangular socket, said metallic socket portions arranged in clamping relation upon opposite sides of the bar and handle portions to hold them in fixed angular relation, and clamping bolts extending through the socket portions for clamping them in position upon the said bar and handle portions.

2. In a handle structure, the combination of a longitudinal bar having a rectangular end formed with transverse grooves one at the top and the other at the bottom near the end, laterally projecting handle portions from each side of the end of the bar, and two clamping plates having socket portions fitting over the bar and handle portions and each provided with projecting parts which are respectively received in one of the transverse grooves of the bar and arranged to bite into the handle portions to hold said parts against shifting relatively to each other, and clamping bolts for drawing the two clamping parts tightly upon the opposite sides of the bar and handle portions.

3. In a clamping device for handles, a casting providing a rectangular socket portion open at one end and closed at the other having a transverse rib in its bottom and two lateral semi-circular sockets arranged at an incline to the rectangular socket portion and at a slight angle to each other and projecting laterally from each side of the rectangular socket portion, and said casting also having bolt apertures at each side of the rectangular socket portion.

In testimony of which invention, I hereunto set my hand.

WM. P. M. BRAUN.

Witnesses:
  R. M. HUNTER,
  E. W. SMITH.